United States Patent [19]

Kline

[11] Patent Number: 6,022,050
[45] Date of Patent: Feb. 8, 2000

[54] SILICONE RELEASE COATING COMPOSITION

[75] Inventor: James R. Kline, Dayton, Ohio

[73] Assignee: Monarch Marking Systems, Inc., Dayton, Ohio

[21] Appl. No.: 09/145,514

[22] Filed: Sep. 2, 1998

[51] Int. Cl.[7] .............................. G09F 3/00; B32B 27/16; B32B 27/20; C08K 3/36; C08K 2/48

[52] U.S. Cl. ..................... 283/81; 428/40.1; 428/40.5; 428/41.5; 428/41.8; 522/77; 522/80; 522/83; 522/99; 522/148; 522/172; 524/860; 524/863; 524/865; 524/866; 524/868

[58] Field of Search .................... 522/77, 80, 83, 522/99, 148, 172; 428/40.1, 40.5, 41.5, 41.8, 447; 524/860, 863, 865, 866, 868; 283/81

[56] References Cited

U.S. PATENT DOCUMENTS

| | | | |
|---|---|---|---|
| 3,989,609 | 11/1976 | Brack . | |
| 4,229,274 | 10/1980 | Carlblom | 522/8 |
| 4,417,023 | 11/1983 | Sinka et al. | 524/731 |
| 5,286,815 | 2/1994 | Leir et al. | 525/477 |
| 5,292,713 | 3/1994 | Stenzel et al. | 503/226 |
| 5,354,588 | 10/1994 | Mitchell et al. | 428/40 |
| 5,494,945 | 2/1996 | Kidon et al. | 522/99 |
| 5,494,979 | 2/1996 | Ebbrecht et al. | 522/99 |
| 5,547,738 | 8/1996 | Mitchell et al. | 428/195 |
| 5,569,515 | 10/1996 | Rice, II et al. | 428/40.5 |
| 5,621,020 | 4/1997 | Khatib et al. | 522/99 |
| 5,631,042 | 5/1997 | Becker et al. | 427/154 |
| 5,651,852 | 7/1997 | Mitchell et al. | 156/252 |
| 5,658,661 | 8/1997 | Mitchell, Jr. et al. | 428/352 |
| 5,663,227 | 9/1997 | Birkholz et al. | 524/262 |
| 5,942,557 | 8/1999 | Ooms et al. | 522/77 |

FOREIGN PATENT DOCUMENTS

| | | | |
|---|---|---|---|
| WO 97/07985 | 3/1997 | WIPO | B41M 5/38 |

OTHER PUBLICATIONS

*Handbook of Pressure–Sensitive Adhesive Technology*, Satas, ed., Chapter 17, pp. 37–383; Chapter 18, pp. 384–403; Chapter 25, pp. 478–497; Chapter 30, pp. 586–604, (1982).

*Primary Examiner*—Susan W. Berman
*Attorney, Agent, or Firm*—Marshall, O'Toole, Gerstein, Murray & Borun

[57] ABSTRACT

A release coating composition containing about 50 to about 75 wt. % of an epoxy functional silicone; about 8 to about 25 wt. % of a reactive solvent; about 5 to about 25 wt. % of a reactive diluent; about 6 to about 12 wt. % of a wax-treated silica powder; and, about 2 to about 4 wt. % of a photoinitiator is disclosed. The composition is useful in preparing a low-gloss release coating for use on linerless labels.

27 Claims, No Drawings

SILICONE RELEASE COATING COMPOSITION

FIELD OF THE INVENTION

The present invention relates to a release coating composition for linerless labels. More particularly, the present invention relates to a release coating composition for use on linerless labels.

BACKGROUND OF THE INVENTION

Linerless labels are known to have advantages over conventional pressure sensitive labels, which are mounted on a disposable, release-coated liner. The release-coated liner serves as a support structure for the transport, printing, and storage of conventional labels. In contrast, a linerless label has a release-coated top face and a pressure sensitive adhesive-coated bottom face, each applied to a paper substrate.

Linerless labels are wound in a roll con-figuration such that the pressure sensitive adhesive bottom face is in contact with the release coated top face. The presence of the release coating on a side opposite the pressure sensitive adhesive enables the labels to be wound to form a roll, and then subsequently unwound, without the adhesive sticking to the release coating. The adhesive further prevents the wound labels from unrolling prematurely.

Conventional methods of manufacturing linerless labels are disclosed in, for example, U.S. Pat. Nos. 5,292,713 and 5,354,588. An exemplary method includes the continuous steps of passing a thermally sensitive face paper through a coating machine and sequentially applying a layer of each of the various materials (e.g., release coating, and pressure sensitive adhesive) to the paper substrate, drying/curing the materials, and, thereafter, rolling the formed linerless labels into a roll, wherein the release-coated face on the outside of the rolled labels.

According to U.S. Pat. No. 5,292,713, suitable release coatings include materials that exhibit low adhesion to the pressure sensitive adhesive such that the formed label roll can be unrolled easily (e.g., without tearing the paper substrate, and without having the release coating stick to the pressure sensitive adhesive). An example of such a release coating composition contains 3 percent, by weight (wt. %) of the composition, of a photoinitiator based on the total weight of the composition, and 97 wt. % of an ultraviolet (UV) curable silicone based on the total weight of the composition. Both the photoinitiator and the curable silicone are commercially available, for example, under the tradenames "UV-9380C," and "UV-$_{9300}$," respectively, from GE Silicones of Waterford, N.Y.

Linerless labels offer significant advantages over the conventional, liner-backed labels, most notably the elimination of the liner. Nonetheless, linerless labels have met only limited commercial success because such labels suffer from several disadvantages. For example, the pressure sensitive adhesives used in the manufacture of linerless labels are weak, and fail to adhere to the paper substrate, but rather preferentially adhere to the release coating. Furthermore, certain pressure sensitive adhesives can detrimentally effect the paper substrate under certain environmental conditions over time. Attempts to overcome these and other problems have focused on the use of additional tie layers that enhance bond strength between the release coating, substrate, and adhesive layers. Other attempts have been directed to modifying the chemical composition of the various layers.

Investigators previously attempted to resolve one or more of the aforementioned problems associated with linerless labels, but were relatively unsuccessful. One attempt utilized a formulation containing: (a) 57 to 80 wt. % of a curable epoxy silicone compound; (b) 12 to 32 wt. % of isopropyl alcohol; (c) 6 to 8 wt. % of an untreated silica powder; and, (d) 2 to 3 wt. % of a photoinitiator. However, unacceptably high gloss (i.e., a gloss value of greater than 8.2 at 20° using a Technidyne gloss meter) resulted from formulations having 6 wt. % or less untreated silica powder.

In order to reduce gloss, the amount of silica was increased. But, the use of higher amounts of the untreated silica powder resulted in a viscous coating that was difficult to coat. Additional isopropyl alcohol was added to reduce composition viscosity, but the increase in the amount of untreated silica powder in the composition, coupled with the reduction in amount of epoxy silicone compound, resulted in a cured coating having an unacceptable amount of dusting attributed to poorly anchored silica powder. This surplus silica dust accumulates on the thermal printheads, thereby requiring cleaning of the printheads on a relatively continual basis. To help reduce the dust problem, the labels were perforated. However, perforations add to the cost of manufacturing and are not desirable in many applications.

It would be desirable to provide a release coating that overcomes one or more of the problems associated with linerless labels. More specifically, it would be desirable to provide a release coating that: (a) does not adhere to the pressure sensitive adhesive; (b) does not significantly insulate the underlying thermal sensitive layer; and (c) is of a suitable quality (e.g., of low gloss) such that the bar codes can be read via electronic means. Furthermore, it would be desirable to provide a release coating that exhibits sufficiently low spectral gloss such that the indicia imaged on the linerless label below the release coating can be read easily by suitable electronic means. Still further, it would be desirable to provide a low-gloss release coating that exhibits improved rub resistance, and provides better press stability during the process of manufacturing the linerless labels and eliminates the need to perforate the label.

SUMMARY OF THE INVENTION

The present invention is directed to release coating compositions for use on thermal direct linerless labels. Accordingly, one aspect of the present invention to provide release coating compositions that overcome one or more of the problems associated with prior release coatings for linerless labels.

As used here and hereafter, the term "release coating composition" is defined as a liquid composition that is applied to a label substrate. The term "release coating" is defined as a cured film or layer of release coating composition. A release coating composition of the present invention is cured with ultraviolet (UV) radiation to provide a release coating.

In particular, the present invention is directed to a silicone-based release coating composition comprising: (a) about 50 to about 75 weight percent ("wt. %") of a UV curable silicone compound; (b) about 8 to about 25 wt. % of a reactive solvent; (c) about 5 to about 25 wt. % of a reactive diluent; (d) about 6 to about 12 wt. % of a wax-treated silica powder; and (e) about 2 to about 4 wt. % of a photoinitiator.

The release coating composition is prepared by a method that includes the steps of admixing a UV curable silicone compound with the reactive solvent, followed by the addition of the reactive diluent and the wax-treated silica powder. The resulting mixture is subjected to vigorous agitation for about 10 to about 60 minutes to form a homogenous mixture. Then the photoinitiator is admixed into the homogeneous mixture to form the release coating composition.

Another aspect to the present invention is to provide a cured release coating having a sufficiently low gloss (i.e., a gloss value of less than 8.2 at 20° using a Technidyne Gloss Meter) such that an indicia image can be rapidly and accurately read by electronic scanners.

Another aspect of the present invention is to provide linerless labels, and particularly thermal direct linerless labels, having a cured silicone release coating of the present invention.

Other aspects and advantages of the invention will become apparent to those skilled in the art from the following detailed description, taken in conjunction with the examples and the appended claims.

DETAILED DESCRIPTION OF THE PREFERRED EMBODIMENTS

The present invention is directed to a release coating composition comprising about 50 to about 75 wt. % of a UV curable silicone compound; about 8 to about 25 wt. % of a reactive solvent; about 5 to about 25 wt. % of a reactive diluent; about 6 to about 12 wt. % of a wax-treated silica powder; and about 2 to about 4 wt. % of a photoinitiator.

Preferably, the release coating composition comprises about 55 to about 70 wt. % of a UV curable silicone compound; about 10 to about 20 wt. % of a reactive solvent; about 8 to about 20 wt. % of a reactive diluent; about 7 to about 11 wt. % of a wax-treated silica powder; and, about 2.5 to about 3.5 wt. % of a photoinitiator.

Most preferably, the release coating composition comprises about 60 to about 65 wt. % of a UV curable silicone compound; about 12 to about 18 wt. % of a reactive solvent; about 8 to about 15 wt. % of a reactive diluent; about 8 to about 11 wt. % of a wax-treated silica powder; and, about 2.5 to about 3.5 wt. % of a photoinitiator.

It has been found that a release coating composition, after curing, provides a release coating having a gloss value below 8.2, and typically a gloss value of below 7, and usually about 6 to about 7, at 20° on the Technidyne Gloss Meter. This low gloss value provides 100% scan rates of two dimensional indicia by various scanners, like laser and CCD scanners. The gloss value of the present release coating is significantly below the 8.2 value at which scanners begin to misread bar codes.

The UV curable silicone compound present in the release coating composition has a photoreactive functionality, such as an acrylic functionality or an epoxy functionality. One class of curable silicone compound is the epoxy functional silicones.

An epoxy functional silicone present in the release coating composition is capable of being cured when subjected to UV radiation. Numerous epoxy functional silicone compounds, or epoxy silicones, are available commercially. For example, epoxy silicones sold under the trade designations UV9400 and UV500A are available from GE Silicones, Waterford, N.Y. UV9400 contains 80–99% by weight of dimethyl, methyl, (2-(7-oxabicyclo(4.1.0) hept-3-yl)ethyl silicone having (dimethyl (2-(7-oxabicyclo(4.1.0) hept-3-yl)ethylsilyl)oxy) terminal groups. UV500A contains about 10–30 percent by weight dimethyl, methyl, 2-(7-oxabicyclo(4.1.0)hept-3-yl)ethyl silicone having (dimethyl (2-(7-oxabicyclo(4.1.0) hept-3-yl) ethylsilyl)oxy) terminal groups. The epoxysilicone in UV9400 and UV500A has a CAS No. 150678-61-8. UV9300 is another suitable epoxy-silicone (containing 80–99% by weight dimethyl, methyl, 2-(7-oxabicyclo(4.1.0) hept-3-yl)-ethyl) silicone (CAS No. 67762-95-2), also available from General Electric.

Additional epoxy functional silicone compounds are available from the General Electric Co. under the trade designations UV9315 and UV9320. UV9315 contains 80–99% by weight dimethyl, methyl, 2-(7-oxabicyclo(4.1.0) hept-3-yl)ethyl silicone having dimethyl (2-(7-oxabicyclo (4.1.0)hept-3-yl)ethylsilyl)-oxy terminal groups (CAS No. 150678-61-8). UV9320 contains 80–99% by weight (2-hydroxy-phenyl)propyl, trimethyl-heptyl-3-yl)ethyl, methyl-3-methyl-2- (7-oxabicyclo (4.1.0)hept-3-yl) ethylsilyl)oxy) silicone having dimethyl siloxy terminal groups (CAS No. 130885-21-1).

Other photopolymerizable silicone compounds are available from Genesee Polymers Corporation of Flint, Mich. For example, photopolymerizable silicone compounds are sold under the trade designations EXP-29 and EXP-32 silicone fluids. EXP-29 is an epoxy-functional dimethylpolysiloxane copolymer having a molecular weight of about 5700 and the structure:

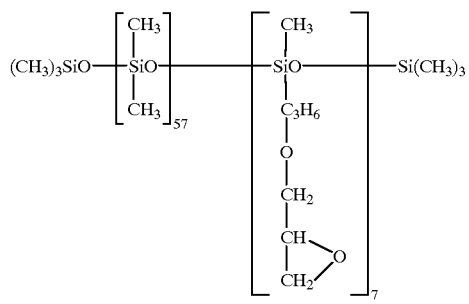

EXP-32 also is an epoxy functional dimethylpolysiloxane copolymer fluid having a molecular weight of about 8300 and the structure:

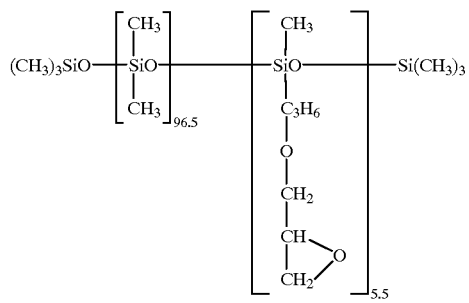

Additional epoxy silicone compounds are described in Koshar et al. U.S. Pat. No. 4,313,988, the disclosure of which is hereby incorporated herein by reference.

A typical epoxy silicone has the structure:

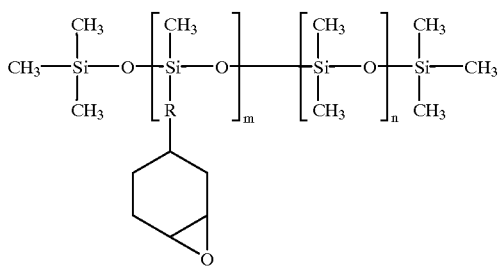

wherein m ranges from 1 to about 10, n ranges from 5 to about 50, and R is an alkylene group having 1 to 3 carbon atoms. Other nonlimiting examples of suitable epoxysilicones include UV-9500 available from GE Silicones, Waterford, N.Y., and PC600 and PC620 available from Rhone-Poulenc, Rock Hill, S.C.

The epoxy functional silicones typically have an epoxy equivalent weight (EEW) of about 300 to about 20,000, and preferably about 500 to about 10,000. To achieve the full advantage of the present invention, the photocurable epoxy silicone polymer has an EEW of about 500 to about 5000. Accordingly, the epoxy functional silicone typically is a liquid compound that is readily soluble in the reactive solvent. The epoxy functional silicone compound resins are well known in the art, and the present composition is not limited with respect to the identity of the epoxy functional silicone compound present in the composition.

The UV curable epoxy compound also can be a silicone compound containing acrylate groups. Such silicone acrylates are well known in the art and are available commercially, for example, from Goldschmidt Chemical Corporation, Hopewell, Va.

The present release coating compositions also contain a reactive solvent. Suitable reactive solvents are miscible with the epoxy functional silicone and have a reactive group capable of reacting with an epoxy group. The portion of the reactive solvent evaporates during cure of the composition, and a portion is cured into, and becomes part of, the release coating. The preferred class of reactive solvents is organic alcohols.

In accordance with an important feature of the present invention, the reactive solvent has an evaporation rate vs. butyl acetate (butyl acetate=1) of less than 1.6, and preferably less than about 0.1 to about 1.5. Nonlimiting examples of alcohols having an evaporation rate vs. butyl acetate of less than 1.6 include, but are not limited to, n-propyl alcohol, amyl alcohol, isobutyl alcohol, n-butyl alcohol, sec-butyl alcohol, cyclohexanol, n-hexanol, n-pentanol, methyl amyl alcohol, and mixtures thereof. An especially preferred reactive solvent is n-propyl alcohol, which is commercially available, for example, from Chem-Central, Hamilton, Ohio.

The present release coating composition also contains a reactive diluent. A suitable reactive diluent is a liquid monomer that is miscible with the epoxy functional silicone and reactive diluent, and that contains two to four reactive moieties that are capable of reaction with the epoxy silicone. Typically, the reactive moieties are vinyl groups, but can be epoxy or hydroxyl groups, for example. The reactive diluent typically contains two reactive moieties. One nonlimiting example of a reactive diluent is the divinyl ether of 1,4-cyclohexane dimethanol, which is commercially available under the tradename "Rapid-Cure CHVE" from International Specialty Products, Bound Brook, N.J. Another suitable reactive diluent is "Rapid Cure DDVE," also available from ISP.

Other reactive diluents include, but are not limited to, a product available from Union Carbide under the trade designation UVR-6110. UVR-6110 contains the difunctional epoxy compound 3,4-epoxycyclohexylmethyl-3,5-epoxycyclohexane carboxylate. Other compounds are, for example, bis(3,4-epoxycyclohexylmethyl)adipate, 2-(3,4-epoxy-cyclohexyl-5.5-spiro-3,4-epoxy)cyclohexane-metaldioxane, a diglycidyl ether of phthalic acid, a diglycidyl ether of hexahydrophthalic acid, a di-glycidyl ether of bisphenol A, a cresol-novolac epoxy resin, other difunctional and multifunctional epoxy compounds, and mixtures thereof.

In accordance with an important feature of the present invention, the silica powder present in the composition is a wax-treated silica powder. The wax-treated silica powder typically is a synthetic amorphous silica surface treated with hydrocarbon-type wax. The treated silica powder has a particle size of about 2 to about 10 microns, a bulk density of about 7 to about 15 pounds per cubic foot, is insoluble in water, and has a dry white powder-appearance at 25° C. A nonlimiting example of a wax-treated silica powder is "SYLOID 7000," commercially available from W. R. Grace & Co., Columbia, Md. Other suitable treated silicas are SYLOID grades 161, 162, 308, 378, 83, and 169.

The present release coating composition also includes a photoinitiator to facilitate cure of the release coating composition upon exposure to UV radiation. Suitable photoinitiators include iodonium and sulfonium salts. Such photoinitiators are theorized to function by ultraviolet light-initiated release of a strong acid that catalyzes the ring-opening polymerization of the epoxy groups in the epoxy silicones. Cure occurs when a mixture of the photoinitiator and the epoxy silicone is exposed to a wavelength of light in the ultraviolet (UV) spectrum. The cure occurs efficiently in air as well as under an inert atmosphere.

The photoinitiator therefore comprises: (i) an iodonium salt, (ii) a sulfonium salt, or (iii) a mixture thereof. The anion of these salts is not limited, but preferably is a complex anion containing Group Va or VIa elements. Exemplary, but nonlimiting, elements present in the anions are, for example: boron, phosphorus, antimony, arsenic, and tin. Nonlimiting examples of suitable nonbasic, nonnucleophilic anions include, but are not limited to: $BF_4^-$, $PF_6^-$, $AsF_6^-$, $SbF_6^-$, $SnCl_6^-$, $SbCl_6^-$, $BiCl_5^{-2}$, $ClO_4^-$, $HSO_4^-$, $ZrF_6^{-2}$, $GaCl_4^-$, $InF_4^-$, $TiF_6^{-2}$, $AlF_6^{-2}$ and $FeCl_4^{-2}$.

Nonlimiting examples of sulfonium salt photoinitiators include the triaryl sulfonium complex salts, such as phenoxyphenyl sulfonium hexafluorophosphate; trifluoromethyl diphenyl sulfonium tetrafluoroborate; triphenyl sulfonium tetrafluoroborate, methyl diphenyl sulfonium tetrafluoroborate, dimethyl phenyl sulfonium hexafluoroborate, triphenyl sulfonium hexafluorophosphate, triphenyl sulfonium hexafluoroantimonate, diphenyl naphthyl sulfonium hexafluoroarsenate, tritolyl sulfonium hexafluorophosphate, anisyl diphenyl sulfonium hexafluoroantimonate, 4-butoxyphenyl diphenyl sulfonium tetrafluoroborate, 4-chlorophenyl diphenyl sulfonium hexafluorophosphate, tri(4-phenoxyphenyl) sulfonium hexafluorophosphate, di(4-ethoxyphenyl) methyl sulfonium hexafluoroarsenate, 4-acetonyl-phenyl diphenyl sulfonium tetrafluoroborate, 4-thiomethoxyphenyl diphenyl sulfonium hexafluorophosphate, di(methoxysulfonylphenyl) methyl sulfonium hexafluoroantimonate, di(nitrophenyl) phenyl sulfonium hexafluoroantimonate, di(carbomethoxyphenyl) methyl sulfonium hexafluorophosphate, 4-acetamidophenyl diphenyl sulfonium tetrafluoroborate, p-(phenylthiophenyl) diphenyl sulfonium hexafluoroantimonate, 10-methylphenoxathiinium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 5-methyl-10-oxothianthrenium tetrafluoroborate, 5-methyl-10,10-dioxothianthrenium hexafluorophosphate, dimethyl naphthyl sulfonium hexafluorophosphate, and mixtures thereof. Bis-type sulfonium salt photoinitiators, such as bis-(4-(diphenylsulfonio) phenyl)sulfide bis-hexafluorophosphate, for example, also can be used.

Many sulfonium salt photoinitiators are available commercially. For example, a preferred sulfonium salt initiator is available under the trade name CYRACURE UVI-6974 from Union Carbide Corporation of Danbury, Conn. CYRACURE UVI-6974 contains a mixture of triaryl sulfonium hexafluoroantimonate salts having CAS Nos. 89452-37-9 and 71449-78-0, and is sold as a 50 wt. % solution in propylene carbonate. CAS No. 89452-37-9 is (thiodi-4,1-phenylene) bis(diphenyl-sulfonium) hexafluoroantimonate. CAS No. 71449-78-0 is diphenyl(4-phenylthiophenyl) sulfonium hexafluoroantimonate. Another suitable sulfonium photoinitiator available from Union Carbide Corporation is CYRACURE UVI-6990. UVI-6990 contains triaryl sulfonium hexafluorophosphate salts having CAS Nos. 74227-35-3 and 68156-13-8, and is sold as a 50% solution in propylene carbonate. CAS No. 74227-35-3 is bis(4-(diphenylsulfonio)phenyl) sulfide bis(hexafluorophosphate). CAS Nos. 68156-13-8 is diphenyl phenylthiophenyl sulfonium hexafluorophosphate.

Nonlimiting examples of useful iodonium salt initiators include the aryl iodonium salts, such as diphenyliodonium tetrafluoroborate, di(2,4-dichlorophenyl)iodonium hexafluorophosphate, diphenyliodonium hexafluorophosphate, diphenyliodonium hexafluoroarsenate, diphenyliodonium iodide, diphenyliodonium hexafluoroantimonate, 4-chlorophenylphenyliodonium tetrafluoroborate, di(4-chlorophenyl)iodonium hexafluoroantimonate diphenyliodonium hexafluorophosphate, diphenyliodonium trifluoroacetate, 4-trifluoromethylphenylphenyl-iodonium tetrafluoroborate, ditolyliodonium hexafluorophosphate, di(4-methoxyphenyl) iodonium hexafluoroantimonate, di(4-methoxyphenyl)-iodonium chloride, (4-methylphenyl) phenyliodonium tetrafluoroborate, di-(2,4-dimethylphenyl) iodonium hexafluoroantimonate, di-(4-t-butylphenyl) iodonium hexafluoroantimonate, 2,2'-diphenyliodonium hexafluorophosphate, di(4-methylphenyl)iodonium tetrafluoroborate, di(4-heptylphenyl)iodonium tetrafluoroborate, di(3-nitrophenyl)iodonium hexafluorophosphate, di(4-chlorophenyl)iodonium hexafluorophosphate, di(naphthyl)iodonium tetrafluoroborate, di(4-trifluoromethylphenyl)iodonium tetrafluoroborate, di(4-methylphenyl)iodonium hexafluorophosphate, diphenyliodonium hexafluoroarsenate, di(4-phenoxyphenyl)iodonium tetrafluoroborate, diphenyliodonium hexachlorostannate, phenyl-2-thienyliodonium hexafluorophosphate, diphenyliodonium hexafluorostannate, 2,2'-diphenyliodonium tetrafluoroborate, di(2,4-dichlorophenyl)iodonium hexafluorophosphate, di(4-bromophenyl)iodonium hexafluorophosphate, di(4-methoxyphenyl)iodonium hexafluorophosphate, di(3-carboxyphenyl)iodonium hexafluorophosphate, di(3-methoxycarbonylphenyl)-iodonium hexafluorophosphate, di(3-methoxysulfonylphenyl)iodonium hexafluorophosphate, di(4-acetamidophenyl)iodonium hexafluorophosphate, di(2-benzothienyl)iodonium hexafluorophosphate, bis(4-dodecylphenyl)iodonium hexafluoroantimonate, bis(4-dodecylphenyl) iodonium hexafluoroarsenate, and mixtures thereof.

Many iodonium salt initiators are also available commercially. A preferred iodonium salt is available from the General Electric Co., New York under the trade designation UV9380C. UV9380C contains about 30% to about 60% by weight bis(4-dodecylphenyl)iodonium hexafluoroantimonate (CAS No. 71786-70-4). Other components of UV9380C are 2-isopropyl thioxanthone, $C_{12}$ and $C_{14}$ alkylglycidyl ethers (about 30% to about 60% by weight), and linear alkylate dodecylbenzene. The $C_{12}$ and $C_{14}$ alkylglycidyl ethers are monoepoxy compounds and can be considered as included in the photopolymerizable component.

Another useful iodonium salt is available from the General Electric Co. under the trade designation UV9310C. The active initiator component of UV9310C is about 30 to about 60 weight percent bis(4-dodecylphenyl)iodonium hexafluoroantimonate (CAS No. 71786-70-4). Other components of UV9310C are 2-ethyl-1,3-hexanediol (about 30-60 weight percent) and a linear alkylate dodecylbenzene (about 5–10 weight percent). The 2-ethyl-1,3-hexanediol present in UV9310C is a polyhydroxy compound capable of reacting with the epoxy functionalities and can be considered as included in the photopolymerizable component of the composition.

Other examples of sulfonium salt and iodonium salt photoinitiators are found, for example, in Guarnery et al. U.S. Pat. No. 4,250,006; Schlesinger U.S. Pat. No. 4,287,228; and Smith U.S. Pat. No. 4,250,053, the disclosures of which are hereby incorporated herein by reference.

In accordance with another important feature of the present invention, the release coating composition is essentially free of water. As used herein, the term "essentially free of water" is defined as a composition containing 0% up to about 1.5%, by weight, free water. As used herein, "free water" is defined as water that is not bound or complexed to another entity, e.g., the water of hydration of an inorganic compound is not included in the calculation of the amount of free water in the composition.

It has been found that compositions containing in excess of about 1.5% by weight water failed to cure properly, which led to sticking, or a "locking up," between the release coating and the adhesive coating when the linerless labels were rolled. Accordingly, all ingredients used in the preparation of a present release coating composition are sufficiently free of free water such that the final composition contains about 1.5% by weight free water or less, and preferably about 1.0% by weight free water or less. To achieve the full advantage of the present invention, the composition contains less than about 0.5% by weight free water.

The release coating compositions can, if desired, include optional additives such as dyes, fillers, pigments, flow agents, antistatic agents, thickeners, thixotropic agents, surface active agents, viscosity modifiers, extending oils, plasticizers, and similar additives known to persons skilled in the art to modify an esthetic or functional property of the release coating composition, or the release coating prepared therefrom. These optional ingredients are included in the release coating composition in an amount sufficient to perform their intended purposes, typically in amounts of 0 to about 10%, by weight, of the release coating composition.

In accordance with the present invention, the release coating composition first is prepared. The release coating composition is prepared by simply admixing composition ingredients until homogeneous. Then, the release coating composition is applied as a coating of predetermined thickness to a solid substrate. The coated substrate then is subjected to UV radiation to cure the release coating composition and provide a release coating.

To illustrate the present release coating composition, the following release coating composition was prepared:

| Ingredient | Example Weight % |
|---|---|
| Epoxy Functional Silicone [1] | 62 |
| Reactive Solvent [2] | 15 |
| Reactive Diluent [3] | 10 |
| Treated Silica Powder | 10 |
| Photoinitiator | 3 |

[1] UV-9500, GE Silicones, Waterford, NY;
[2] n-propyl alcohol;
[3] divinyl ether of 1,4-cyclohexane dimethanol;
[4] SYLOID 7000, W.R. Grace and Co., Columbia, MD; and
[5] UV-9380C, a photoactive iodonium salt available from GE Silicones.

The composition of Example 1 was prepared by adding the epoxy functional silicone to a vessel equipped with a stirrer. The epoxy silicone was agitated, then the reactive solvent and reactive diluent were added to the vessel, and stirring was continued. Next, the treated silica powder was added to the vessel. The resulting mixture was stirred at a rapid rate for about 30 minutes until the mixture was homogeneous. Finally, the photoinitiator was added, and stirring was continued for about 15 minutes. The resulting release coating composition was anhydrous, and had a shelf life of about 5 days. It is expected that the shelf life can be extended to 14 days by omitting addition of the photoinitiator to the composition.

A release coating is prepared by applying coating or layer of a release coating composition of the present invention on a substrate, then UV curing the composition. The efficient cure of a release coating composition is related to several interdependent parameters. These parameters include the chemical identity and photochemical properties of the epoxy functional silicone and the photoinitiator. In addition, the strength of the UV radiation and the cure time are interdependent process parameters that are considered in order to achieve a sufficiently cured composition for given curing conditions. Accordingly, a present release coating composition is cured for a sufficient time under UV radiation (i.e., about 200 to about 450 nm) to provide a dry, tack-free release coating.

In particular, after the release coating composition has been prepared, the composition is applied onto the substrate by conventional means known to those skilled in the art. Common coating methods such as rod, blade, multiroll coaters, gravure, or flexographing can be used. The release coating composition preferably is applied at a rate of about 0.4 to about 1.2 lbs. of composition per 3,000 ft² of substrate, and more preferably, about 0.5 to about 0.8 lbs. per 3,000 ft², to provide a coated substrate.

The coated substrate then is exposed to UV radiation, such as that produced by a 600 watt Type "H" UV lamp, like Model DRW-1101 UPS-6, available from Fusion, Gaithersburg, Md. Upon exposure to UV radiation, the photoinitiator decomposes to generate a Lewis acid. As known in the art, a Lewis acid effectively initiates polymerization of the epoxy functional silicone.

The composition of Example 1, therefore, was applied to a surface of paper substrate, i.e., T2062 OPTIMA, available from Appleton Paper Co., using a flexographic print station in order to prepare a linerless label. The composition of Example 1 was applied to the paper substrate as a film having a coating weight about 0.7 lb./3,000 ft². The coated substrate was cured at ambient temperature (i.e., about 28° C.) and under an ambient atmosphere (i.e., no nitrogen inerting) by passing the substrate through an apparatus having a single medium pressure mercury lamp (Type "H") to provide UV radiation. A coating of an adhesive was applied to the opposite surface of the paper substrate using standard techniques.

The resulting linerless labels exhibited excellent release when unwound from a roll. The release coating composition also consistently exhibited gloss value of about 6 to about 7 at 20° on the Technidyne Gloss Meter (a well-known testing apparatus known to persons skilled in the art), and exhibited 100% scan rates of two-dimensional indicia using CCD scanners.

Such a low gloss provided unexpected benefits for both label users and manufacturers of the label. The low gloss value of about 6 to about 7 is well below the 8 to 8.2 maximum value that is required to achieve 100% read rates using electronic scanners. Label users, therefore, have a relatively large safety margin with respect to low gloss and accurate scanning. In addition, prior matte linerless labels required perforations in order to eliminate dust accumulation on printheads from poorly anchored silica. The perforation performs as a mild abrasive to remove dust from the printhead. The present release coating overcomes the dust problems, and, accordingly, the linerless labels do not require perforations.

Linerless label manufacturers also realize benefits from the present release coating compositions. In particular, the consistent, low gloss value eliminates the need to test each batch of labels for a suitable gloss value. In addition, using the reactive solvents disclosed herein eliminates the need to adjust viscosity and percent solids at the press during extended runs.

The release coating compositions of the present invention provide significant advantages over prior compositions in that the present compositions: (a) do not adhere to the pressure sensitive adhesive; (b) do not inhibit the ability for subsequent imaging of the underlying thermal sensitive coating; and (c) are of sufficiently low gloss such that the bar codes can be read via electronic means. The present compositions exhibit a low spectral gloss such that the indicia imaged on the linerless label beneath the coating are easily and accurately read by suitable electronic means, like lasers and CCD scanners, for example, scanners that operate at a peak response of 750 nm (nanometers). Further, the present compositions exhibit improved rub resistance, and provide better press stability during the process of manufacturing linerless labels.

Obviously, many modifications and variations of the invention as hereinbefore set forth can be made without departing from the spirit and scope thereof, and, therefore, only such limitations should be imposed as are indicated by the appended claims.

What is claimed is:

1. A release coating composition comprising
   (a) about 50 to about 75 wt. % of an ultraviolet radiation curable silicone compound;
   (b) about 8 to about 25 wt. % of a reactive solvent;
   (c) about 5 to about 25 wt. % of a reactive diluent;
   (d) about 6 to about 12 wt. % of a wax-treated silica powder; and,
   (e) about 2 to about 4 wt. % of a photoinitiator.

2. The composition of claim 1 wherein the curable silicone compound is present in an amount of about 55 to about 70 wt. %.

3. The composition of claim 1 when the curable silicone compound comprises an epoxy functional silicone.

4. The composition of claim 3 wherein the epoxy functional silicone has an epoxy equivalent weight of about 300 to about 20,000.

5. The composition of claim 3 wherein the epoxy functional silicone polymer is selected from the group consisting of dimethyl, methyl, 2-(7-oxabicyclo(4.1.0) hept-3-yl)ethyl silicone having (dimethyl (2-(7-oxabicyclo(4.1.0)hept-3-yl) ethyl-silyl)-oxy) terminal groups; dimethyl, methyl, 2(7-oxabicyclo(4.1.0) hept-3-yl)ethyl) silicone; (2-hydroxyphenyl)propyl, trimethylheptyl-3-yl)ethyl, methyl-3-methyl-2-(7-oxabicyclo(4.1.0)help-3-yl)-ethylsilyl)-oxy) silicone having dimethyl siloxy terminal groups;

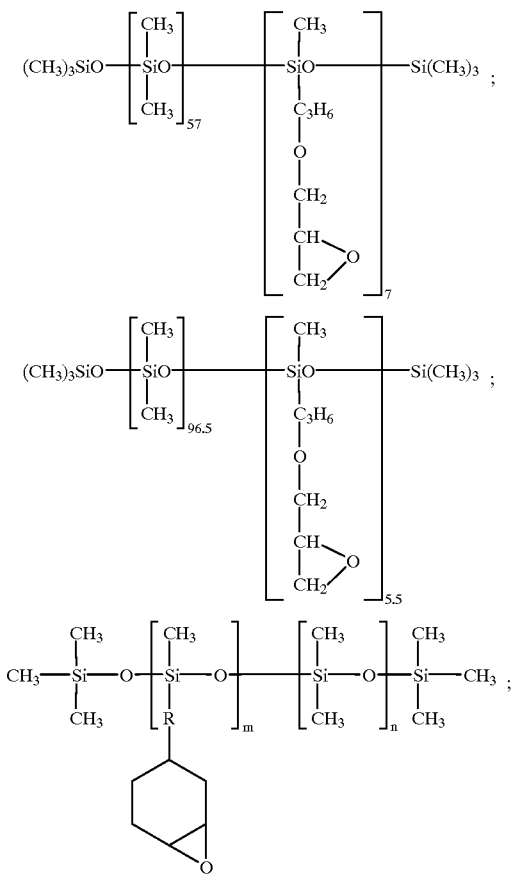

wherein m ranges from 1 to about 10, n ranges form 5 to about 50, and R is an alkylene ground having 1 to 3 carbon atoms; and mixtures thereof.

6. The composition of claim 1 wherein the curable silicone compound comprises a silicone acrylate.

7. The composition of claim 1 wherein the reactive solvent is present in an amount of about 10 to about 20 wt. %.

8. The composition of claim 1 wherein the reactive solvent has an evaporation rate vs. butyl acetate of less than about 1.6.

9. The composition of claim 1 wherein the reactive solvent comprises an alcohol.

10. The composition of claim 9 wherein the alcohol is selected from the group consisting of n-propyl alcohol, amyl alcohol, isobutyl alcohol, n-butyl alcohol, sec-butyl alcohol, cyclohexanol, n-pentanol, n-hexanol, methyl amyl alcohol, and mixtures thereof.

11. The composition of claim 1 wherein the reactive diluent is present in an amount of about 8 to about 20 wt. %.

12. The composition of claim 1 wherein the reactive diluent is selected from the group consisting of divinyl ether of 1,4-cyclohexane dimethanol, 3,4-epoxycyclohexylmethyl-3,4-epoxy-cyclohexane carboxylate, bis(3,4-epoxycyclohexyl-methyl)adipate, 2-(3,4-epoxycyclohexyl-5.5-spiro-3,4-epoxy)cyclohexane-metal-dioxane, a diglycidyl ether of phthalic acid, a diglycidyl ether of hexa-hydrophthalic acid, a diglycidyl ether of bisphenol A, a cresol-novolac epoxy resin, a $C_8$–$C_{18}$ alkyl-glycidyl ether, and mixtures thereof.

13. The composition of claim 1 wherein the wax-treated silica is present in an amount of about 8 to about 11 wt. %.

14. The composition of claim 1 wherein the wax-treated silica is treated with a hydrocarbon wax.

15. The composition of claim 1 wherein the photoinitiator comprises an iodonium salt, a sulfonium salt, or a mixture thereof.

16. The composition of claim 1 comprising:

(a) about 55 to about 70 wt. % of the UV curable silicone compound;

(b) about 10 to about 20 wt. % of the reactive solvent;

(c) about 8 to about 20 wt. % of the reactive diluent;

(d) about 7 to about 11 wt. % of the wax-treated silica powder; and, (e) about 2.5 to about 3.5 wt. % of the photoinitiator.

17. The composition of claim 1 comprising:

(a) about 60 to about 65 wt. % of the epoxy functional silicone;

reactivet 12 to about 18 wt. % of the reactive solvent;

(c) about 8 to about 15 wt. % of the reactive diluent;

(d) about 8 to about 11 wt. % of the wax-treated silica powder; and, (e) about 2.5 to about 3.5 wt. % of the photoinitiator.

18. The composition of claim 1 wherein the reactive solvent comprises n-propyl alcohol.

19. The composition of claim 1 wherein the reactive diluent comprises a divinyl ether of 1,4-cyclohexane dimethanol.

20. The composition of claim 1 wherein the composition is essentially free of free water.

21. The composition of claim 1 wherein the composition contains less than 1.5% free water.

22. A release coating resulting from ultraviolet curing of a composition of claim 1.

23. The release coating of claim 22 having a gloss value of about 6 to about 8 at 20°.

24. The coating of claim 22 having a gloss value of about 6 to about 7 at 20°.

25. A label comprising a substrate, and having one surface of the substrate coated with a layer of a release coating, said release coating resulting from curing a release coating composition of claim 1.

26. The label of claim 25 wherein the label is a linerless, thermal direct label.

27. A label comprising a substrate and a release coating, said release coating comprising a wax-treated silica powder.

* * * * *

UNITED STATES PATENT AND TRADEMARK OFFICE
CERTIFICATE OF CORRECTION

PATENT NO. : 6,022,050
DATED : February 8, 2000
INVENTOR(S) : James R. Kline

It is certified that error appears in the above-identified patent and that said Letters Patent is hereby corrected as shown below:

Column 11, line 53, replace "form" with "from".

Column 12, line 4, replace "reactivet" with "(b) about".

Signed and Sealed this

Eighth Day of May, 2001

Attest:

NICHOLAS P. GODICI

Attesting Officer     Acting Director of the United States Patent and Trademark Office